Figure 1:
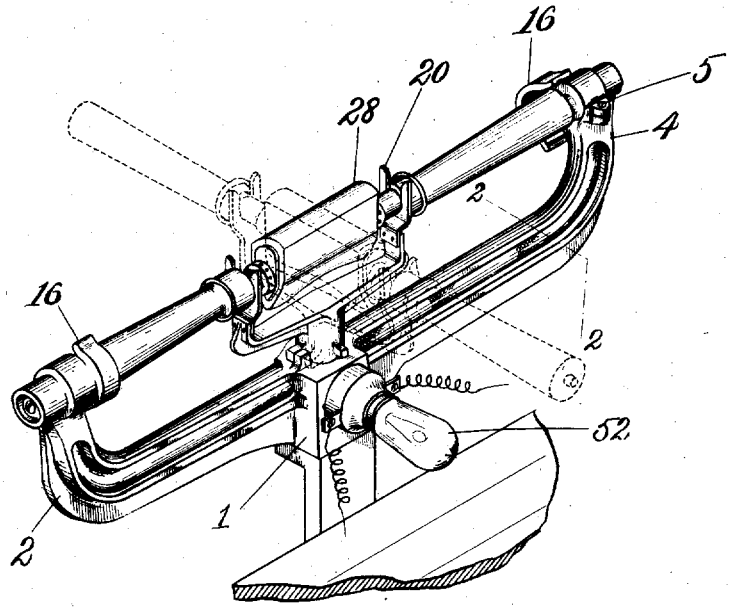

J. OERTLY & C. F. DUDLEY.
APPARATUS FOR HEATING TOOLS ELECTRICALLY.
APPLICATION FILED APR. 6, 1907.

974,420.

Patented Nov. 1, 1910.

WITNESSES:
Bertha H. Hathaway.
Elizabeth C. Coupe

INVENTORS
John Oertly
Charles F. Dudley
By their Attorney

J. OERTLY & C. F. DUDLEY.
APPARATUS FOR HEATING TOOLS ELECTRICALLY.
APPLICATION FILED APR. 6, 1907.

974,420.

Patented Nov. 1, 1910.
2 SHEETS—SHEET 2.

WITNESSES.                INVENTORS.

UNITED STATES PATENT OFFICE.

JOHN OERTLY, OF CINCINNATI, OHIO, AND CHARLES F. DUDLEY, OF BELLEVUE, KENTUCKY, ASSIGNORS TO O. A. MILLER TREEING MACHINE COMPANY, OF PORTLAND, MAINE, A CORPORATION OF MAINE.

APPARATUS FOR HEATING TOOLS ELECTRICALLY.

974,420.     Specification of Letters Patent.     Patented Nov. 1, 1910.

Application filed April 6, 1907. Serial No. 366,829.

*To all whom it may concern:*

Be it known that we, JOHN OERTLY and CHARLES F. DUDLEY, citizens of the United States, residing at Cincinnati, in the county of Hamilton and State of Ohio, and Bellevue, in the county of Campbell and State of Kentucky, respectively, have invented certain Improvements in Apparatus for Heating Tools Electrically, of which the following description, in connection with the accompanying drawings, is a specification, like reference characters on the drawings indicating like parts in the several figures.

This invention relates to apparatus for heating tools electrically and more particularly to apparatus for use in connection with electrically heated tools in which the resistance constituting the heating agency is arranged upon the interior of the tool.

The present invention is herein disclosed embodied in an apparatus for heating treeing irons used in finishing boots or shoes after the making operations.

The use of electricity for heating a treeing iron permits results to be secured which it is practically impossible to obtain where an iron is heated by a gas flame, according to the practice now commonly followed in the art. An electrically heated iron is more cleanly in use than an iron heated by gas and it is also considerably safer, in that it obviates the necessity of employing an exposed gas flame as a source of heat. Furthermore, the temperature of an electrically heated iron may be more accurately controlled than that of a gas heated iron. Where a gas flame is employed as a heating means, it is practically impossible to prevent wide fluctuations in the temperature to which an iron is raised by the heating device, and there is considerable liability of overheating an iron and of thereby injuring the work upon which it is used. The use of electricity minimizes the danger of overheating and permits the temperature of the iron to be controlled more conveniently and with considerably greater accuracy than is possible in the use of gas.

Heretofore it has been proposed to use electrically heated treeing irons provided with internally arranged resistances and equipped with flexible electrical connections leading to the iron. It has been found, however, that the operator in ironing a boot or shoe is considerably hampered by the electrical connections with which the iron is provided. The presence of wires attached to an iron not only interferes with the free manipulation of the iron, which is necessary in ironing a boot or shoe, but is also disadvantageous in that the wires are liable to become broken or short-circuited through continued use of the tool. The delay occasioned by the necessity of frequently repairing or replacing irons heated in this way constitutes a serious objection to their use apart from the additional expense of keeping them in order. Where an iron is provided with electrical connections secured thereto, it is also difficult to prevent excessive waste of electricity such as is occasioned, for example, by failing to shut off the supply while the iron is not in use. Such waste is particularly excessive where a rheostat is interposed between the iron and the source of supply, as has been proposed, to control the amount of current supplied to the iron, since such a device merely absorbs the current not required at the iron.

To avoid the foregoing objections, the present invention contemplates the provision of an iron that may be mechanically disconnected from its source of electrical supply and may be used for ironing a boot or shoe while such connection is broken. It is essential, in order to meet practical requirements, that an iron used in this way be capable of being quickly and conveniently connected with its source of supply, or disconnected therefrom, for otherwise an excessive amount of time will be consumed in making or breaking the connection. Th arrangement herein disclosed is accordingly such that an iron may be quickly brought into operative relation to its source of supply or removed from contact therewith. An important feature of the invention, considered from this point of view, consists in arranging the parts so that operative relation with the source of supply is secured by bringing an iron into engagement with suitably arranged terminals, the provision of separate controlling devices requiring manual actuation to make or break the electrical connection being unnecessary.

In the preferred form of our invention, we provide a support for sustaining an iron while not being used by the operator. The support is equipped with terminals for supplying electricity to the iron and the iron is provided with contacts having electrical connection with a heating resistance within its acting part. The arrangement is such that the contacts on the iron are in engagement with the terminals of the support while the iron is in operative position upon the support. While in this position, an electrical circuit is completed through the heating resistance of the iron. When the iron is moved from operative relation to its supply terminals, the electrical circuit is broken and the iron is free from all mechanical connections, so that it may be manipulated as freely as desired. The support is preferably equipped with a holder for the iron constructed and arranged so that the iron may rest by gravity thereon. In the construction shown, the holder is arranged for movement upon the support from an inoperative position in which the iron is out of engagement with the supply terminals into an operative position in which the contacts on the iron have engagement with said terminals and complete a circuit through the heating resistance. The holder is arranged to be freely movable upon its support, so that by manipulating the iron superposed thereon said iron may be brought into operative relation to the terminals upon the support or disengaged therefrom.

The iron herein disclosed comprises an acting part having an internally arranged heating resistance and handles extending in opposite directions from said acting part. The two contacts on the iron are preferably arranged upon the handles and in the construction shown they are mounted upon the ends of the handles and connected with the heating resistance by conductors passing longitudinally through the handles. While this constitutes our preferred construction, it will be understood that the arrangement of the contacts may be varied from that shown without departing from the present invention, the apparatus herein shown being illustrative merely of one embodimenet of the invention.

The particular construction of support herein described comprises oppositely arranged terminals which are adapted to have engagement with the contacts upon an iron arranged lengthwise between them. The holder for the iron is arranged between said terminals and is pivotally movable about a vertical axis from an operative position in line with said terminals into inoperative position at an angle to the line of the terminals. Stops are preferably provided to limit movement of the holder in both directions and the terminals upon the support and conductors leading thereto are preferably shielded from accidental contact with the operator.

The present invention also contemplates the provision of a device for indicating when current is being supplied to the iron. The arrangement shown comprises a lamp carried by the support, electrical connections leading to the lamp from the heating circuit, and means for controlling said connections in accordance with the position of the holder upon the support. In the operative position of the holder, the lamp circuit is completed and the lamp brought into operation. By the use of an indicator of this nature, the liability of leaving an iron in operative relation to the supply terminals for an excessive length of time is considerably lessened.

Other features of the invention, the advantages of which will be apparent to one skilled in the art, will be hereinafter described and defined in the claims.

Figure 2:
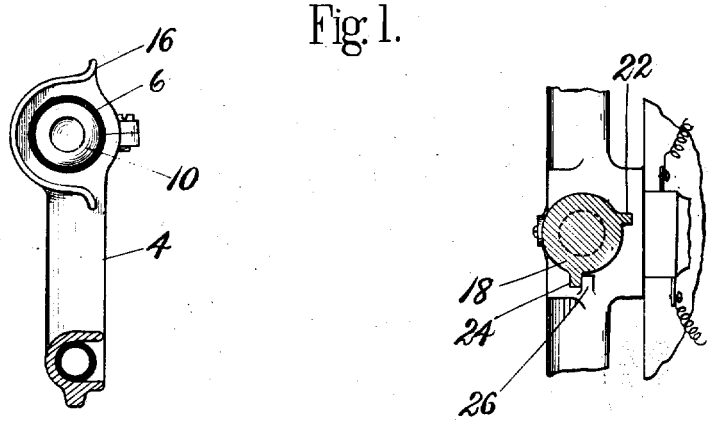
Figure 3:
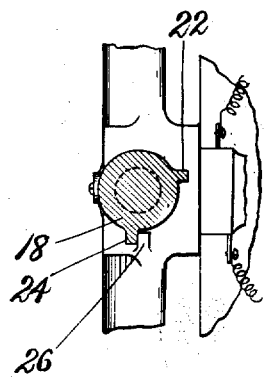
Figure 4:
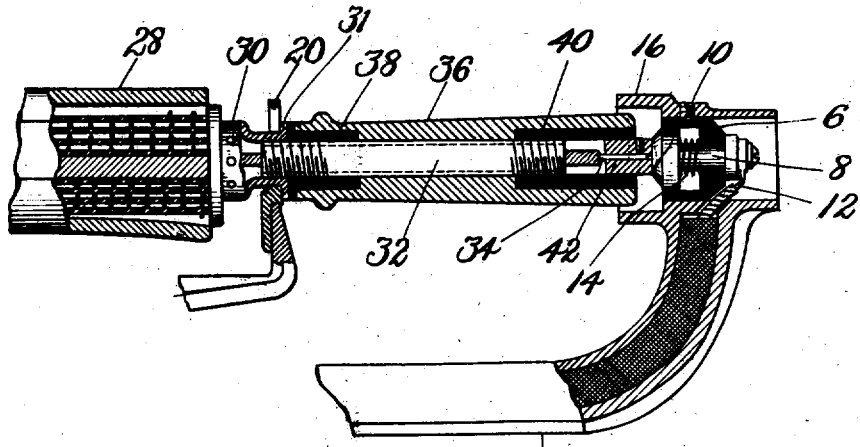
Figures 5, 6:
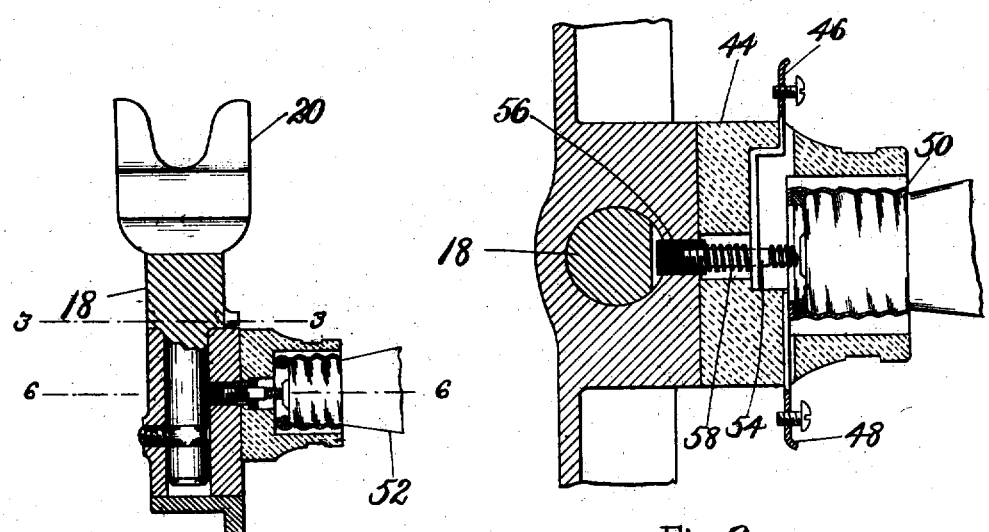

In the drawings:—Figure 1 is a view in perspective of an apparatus constituting one embodiment of the invention; Fig. 2 is a vertical sectional view on the line 2—2 of Fig. 1; Fig. 3 is a horizontal sectional view on the line 3—3 of Fig. 5; Fig. 4 is an enlarged view in side elevation with parts in section of a portion of the apparatus shown in Fig. 1; Fig. 5 is a vertical sectional view taken transversely through the center of the apparatus shown in Fig. 1; and Fig. 6 is a horizontal sectional view on the line 6—6 of Fig. 5.

Referring to the drawings, 1 indicates a support which may, if desired, be mounted in convenient position upon the frame of a treeing machine. The support is provided with arms 2 and 4 extending in opposite directions and provided with upwardly projecting extremities arranged at a distance apart suitable to permit a treeing iron to be inserted lengthwise between them. Each of the arms 2 and 4 is provided at its upper end with a split sleeve provided with a clamping screw 5. A cup-shaped insulating member 6 (see Fig. 4) is clamped within each sleeve and arranged for adjustment longitudinally thereof. Within each member 6 is provided a plunger 8 arranged for horizontal sliding movement and having at its inner end a beveled head 10. The central portion of the head is preferably concave, as shown in Fig. 4. The plungers 8 are connected at their outer ends with electric conductors 12 which may conveniently be arranged within the arms 2 and 4, said arms being open laterally for the greater part of their length, as will be apparent from Fig. 1, to facilitate insertion and removal of the conductors. Between the head 10 of each of the plungers and the base of the surrounding cup-shaped member 6 is arranged a spring 14 which holds said plunger yieldingly toward the center of the support. Each of the arms 2 and 4 is provided at its upper end with a shield 16, said shields being laterally open as shown in Fig. 2 and partially covering the terminals formed by the plungers 8 so that accidental contact by the operator with said terminals is prevented.

Arranged centrally upon the support between the two terminals is a holder comprising a vertical stem 18, arranged for pivotal movement in a vertical bearing formed in the support. Said stem is provided at its upper end with laterally projecting extensions carrying vertically arranged forks 20 formed to receive a treeing iron, such as is hereinafter described. The extent of pivotal movement of the stem 18 is preferably limited by lugs 22 and 24 coöperating with a stop 26 upon the support 1. The forks 20 are preferably made of brass in order to prevent fracture in case an iron be roughly dropped thereon.

The treeing iron shown comprises an acting part 28 of the shape required in tools of this class, said acting part being provided with a heating resistance upon its interior and having handles leading from opposite sides. In the preferred construction illustrated, the handles are identical in construction and but one will be described.

Referring to Fig. 4, 30 represents an internally threaded neck, rigidly secured to the acting part 28 and provided with perforations to reduce conduction of heat from the part 28. The neck 30 is provided with a cylindrical portion intermediate its ends which, in the operative position of the iron upon the holder, is embraced by a fork 20, said neck having a shoulder 31 to position the iron upon the fork. A tube 32, constituting the back bone of the handle, is screwed into the neck 30 and a conductor 34 passes through said tube to the heating resistance arranged within the acting part of the iron. Upon the tube 32 is mounted a casing 36 of wood constituting the exterior part of the handle. The wooden casing 36 is preferably separated from the neck 30 by insulation 38 in order to minimize the conduction of heat from the acting part of the iron to the handle.

Within the outer portion of the wooden casing 36 is arranged a tubular cylinder 40 of insulating material, within which is secured a contact plug 42 connected to a conductor 34 and projecting beyond the end of the handle. The end of each plug 42 is preferably somewhat rounded and, in the operative position of the parts illustrated in Fig. 4, has engagement with the end of a plunger 8, so that an electrical connection is provided between the heating resistance of the iron and the conductors 12 carried by the support.

A convenient construction for indicating when the heating circuit is made or broken comprises an insulating member 44 mounted upon the support 1 and carrying conductors 46 and 48 having connection, respectively, with the conductors arranged in the arms 2 and 4. Said insulating member 44 is provided with a shell 50 mounted upon its interior, said shell receiving a lamp 52. A plunger 54 is arranged for reciprocatory movement in a horizontal bearing formed within the member 44 and intersecting the vertical bearing in which is received the stem 18, said plunger being in electrical contact with the conductor 46.

Referring to Figs. 5 and 6, the plunger 54 is provided at one end with a head 56 of insulating material and is held yieldingly toward the stem 18 by means of a spring 58. The stem 18 is cut away upon one side at such a point that when the holder is turned to move the forks 20 out of alinement with the arms 2 and 4 the plunger 54 enters the recess formed in said stem. The outer end of the plunger 54 is provided with a head for engagement with the central terminal of the lamp. The conductor 48 is connected to the shell 50 which is in electrical contact with the other terminal of the lamp. It will be seen that in the position of the parts shown in Fig. 5 the outer end of the plunger 54 has been forced into engagement with the central terminal of the lamp, thus completing the lamp circuit. When the stem 18 is turned into the position illustrated in Fig. 6, the plunger 54 is retracted from engagement with said central terminal and the lamp circuit is broken.

In the use of the apparatus shown, the iron when not required by the treeing machine operator is superposed upon the brackets 20 of the holder. The heating resistance within the iron may be thrown into or out of operation by swinging the iron and the holder one way or the other upon the support. When the iron is moved into the full line position shown in Fig. 1 the contacts 42 engage the beveled portion of the terminal plungers 8 and move said plungers laterally to permit the entrance of the iron between them. The ends of the contacts 42, in the operative position of the iron, rest in the concavities formed in the face of the plungers 8 and the iron is thus yieldingly retained in said position. To remove the iron, it is merely necessary to swing it out of engagement with the terminals upon the support and lift it from the holder. If desired the iron may be left in the dotted line position shown in Fig. 1 wherein the supply of electricity thereto is shut off. The support may be arranged within convenient reach and as it is compact and simple in construction, it is preferably mounted upon the frame of the treeing machine in front of the operator.

It will be observed that but little attention is required in placing the iron in position upon the holder. Since the two dles and also opposite halves of the support are identical in construction, it is immaterial which end of the iron be presented to a particular terminal. As will be obvious, it is also immaterial which side of the iron is uppermost when it is placed upon the holder, as electrical contact with the terminals upon the support may be obtained in whatever axial position the iron may lie. It will also be seen that on account of the presence of the shields 16 the iron cannot be removed from the holder in the working position of the latter. The shields 16, as will be obvious, also prevent the insertion of an iron in the holder in the working position of the holder. It is thus necessary that the holder be in its inoperative position both in applying and removing an iron.

The lamp 52 furnishes an indicator, apparent at some distance, of the condition of the apparatus. As it attracts attention, when it is in operation, to the fact that the heating circuit is closed, it tends to prevent waste of electricity such as would be occasioned by accidentally leaving the heating circuit closed for an excessive length of time.

Having described our invention, what we claim as new and desire to secure by Letters Patent of the United States is:—

1. The combination with a treeing iron provided with a heating resistance within its acting part, and with handles extending from opposite sides of said part, of a support for removably sustaining said iron by engagement with its handles, contacts upon said iron electrically connected with the resistance and terminals upon said support for completing a circuit through the resistance arranged to have engagement with the contacts upon the iron in the operative position of the iron upon said support.

2. The combination with a treeing iron provided with a heating resistance within its acting part, and with handles extending from opposite sides of said part, of a support for removably sustaining said iron by engagement with its handles, contacts carried by said iron upon opposite sides of said acting part and electrically connected with the resistance and terminals upon the support for completing a circuit through the resistance arranged to have engagement with the contacts upon the iron in the operative position of the iron upon the support.

3. The combination with a treeing iron provided with an internally arranged heating resistance, of a support, a holder for removably sustaining said iron arranged for movement upon the support from an inoperative to a working position, contacts upon the iron electrically connected with the resistance and terminals upon said support arranged to have engagement with the contacts upon the iron in the working position of said holder to complete a circuit through the resistance and to be disengaged therefrom in the inoperative position of said holder.

4. The combination with a treeing iron provided with an internally arranged heating resistance, of a support, a holder for removably sustaining said iron in an approximately horizontal position arranged for movement from an inoperative to a working position, contacts upon the iron electrically connected with the resistance and terminals upon the support arranged in the path of the contacts upon the iron for completing a circuit through the resistance in the working position of said holder.

5. The combination with an iron provided with a heating resistance within its acting part, and with handles extending in opposite directions from said part, of a support, a holder formed to sustain removably said iron and arranged for movement upon said support from an inoperative to a working position, contacts upon said handles electrically connected with the resistance and terminals upon the support arranged in the path of the contacts upon the handles in position to complete a circuit through the resistance in the working position of the holder.

6. The combination with an iron provided with a heating resistance within its acting part and with handles extending in opposite directions from said part, of a support, a holder formed to sustain removably said iron and arranged for pivotal movement upon said support from an inoperative to a working position, contacts arranged upon the ends of the handles and electrically connected with the resistance and terminals upon the support arranged to have engagement with the contacts upon the handles in the working position of said holder.

7. The combination with an iron provided with a heating resistance, of a support, a pair of terminals carried by said support, a pair of contacts carried by the iron and designed to engage said terminals, a holder for the iron pivotally movable upon said support into and out of circuit closing position, a lamp carried by said support, electrical connections leading to said lamp and means for controlling a circuit through said connections in accordance with the position of the holder.

8. The combination with an iron having a heating resistance within its acting part, handles extending in opposite directions from said part and contacts arranged upon the ends of the handles, and electrically connected with the resistance, of a support having oppositely arranged terminals adapted to receive the iron lengthwise between them, and a holder pivotally sustained upon the support between said terminals and in its working position arranged to sustain the iron with its contacts in engagement with said terminals.

9. A treeing iron having an acting part provided upon its interior with a heating resistance, two handles extending in opposite directions from said part, supply and return contacts arranged, respectively, in an exposed position upon the two handles and electrical connections leading from said contacts to the resistance.

10. The combination with an iron provided with an internally arranged heating resistance, of a support, a holder for removably sustaining said iron constructed for movement upon the support from an inoperative to a working position and arranged to receive the iron in said inoperative position, contacts upon the iron electrically connected with the resistance, terminals upon said support arranged to have engagement with the contacts upon the iron in the working position of the holder and to be disengaged therefrom in the inoperative position of said holder, and means for preventing removal of the iron from the holder in its working position.

11. The combination with an iron provided with an internally arranged heating resistance, of a support, a holder for removably sustaining said iron constructed for movement upon the support from an inoperative to a working position and arranged to receive the iron in said inoperative position, contacts upon the iron electrically connected with the resistance, terminals upon said support arranged to have engagement with the contacts upon the iron in the working position of the holder and to be disengaged therefrom in the inoperative position of said holder, and means for preventing insertion of the iron in the holder in the working position of said holder.

12. The combination with the terminals of an electric supply system of a treeing iron adapted to be heated by an electric current, a pair of contacts carried by said iron, the distance between the outer faces of which is greater than the normal distance between the terminals, and yielding means for pressing said contacts and terminals together during the heating operation.

13. The combination of a treeing iron adapted to be heated by an electric current, rigid contacts upon said iron, and yielding terminals arranged to permit the contacts to be forced between them.

14. The combination of a treeing iron provided with an internal heating resistance, contacts electrically connected with said resistance, a support, terminals of an electric supply system carried by said support, and a holder, said support and holder being movable relatively into one position to connect said resistance through said contacts with said terminals and into another position to free said resistance from all connection with said supply system.

In testimony whereof we have signed our names to this specification in the presence of two subscribing witnesses.

JOHN OERTLY.
CHARLES F. DUDLEY.

Witnesses:
 LUISE BECK,
 LEO O'DONNELL.